May 11, 1926.
G. A. MITCHELL
PRINTER
Filed Sept. 5, 1922          2 Sheets-Sheet 2
1,584,185
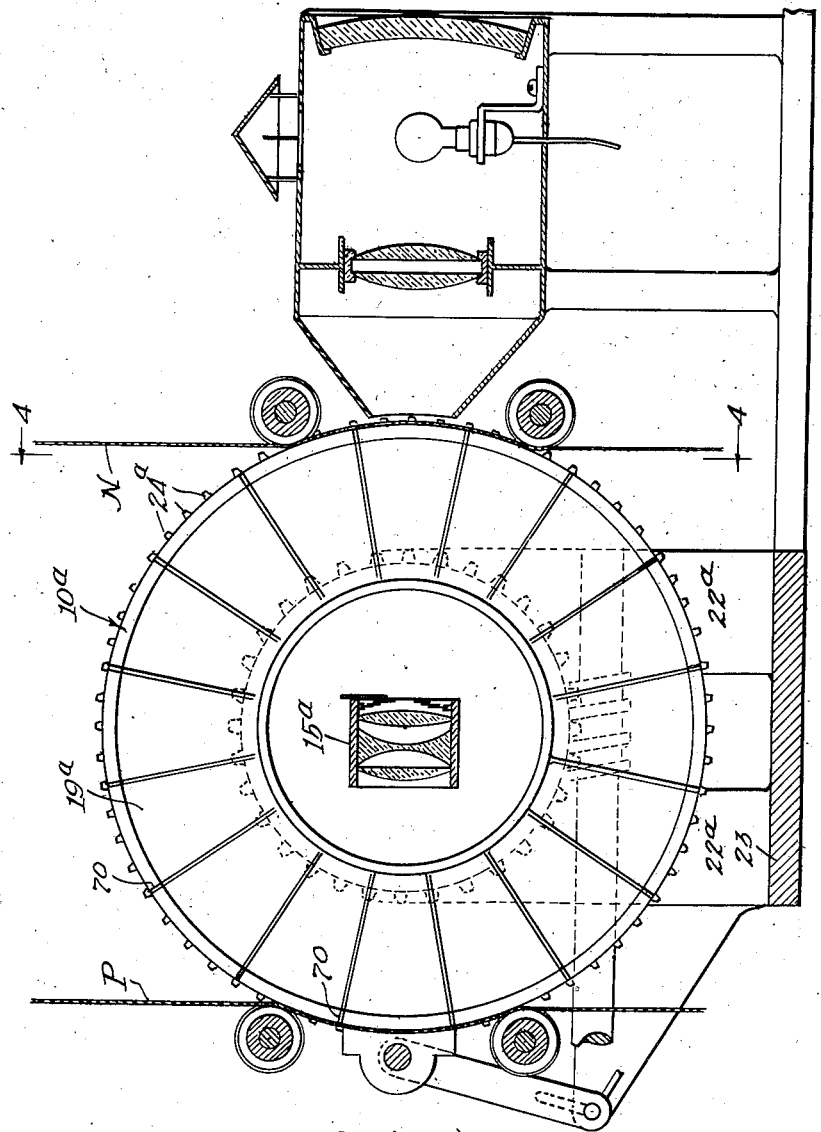
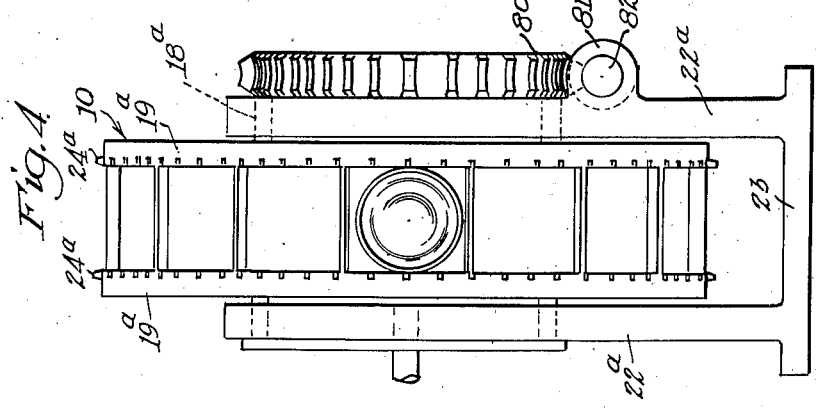

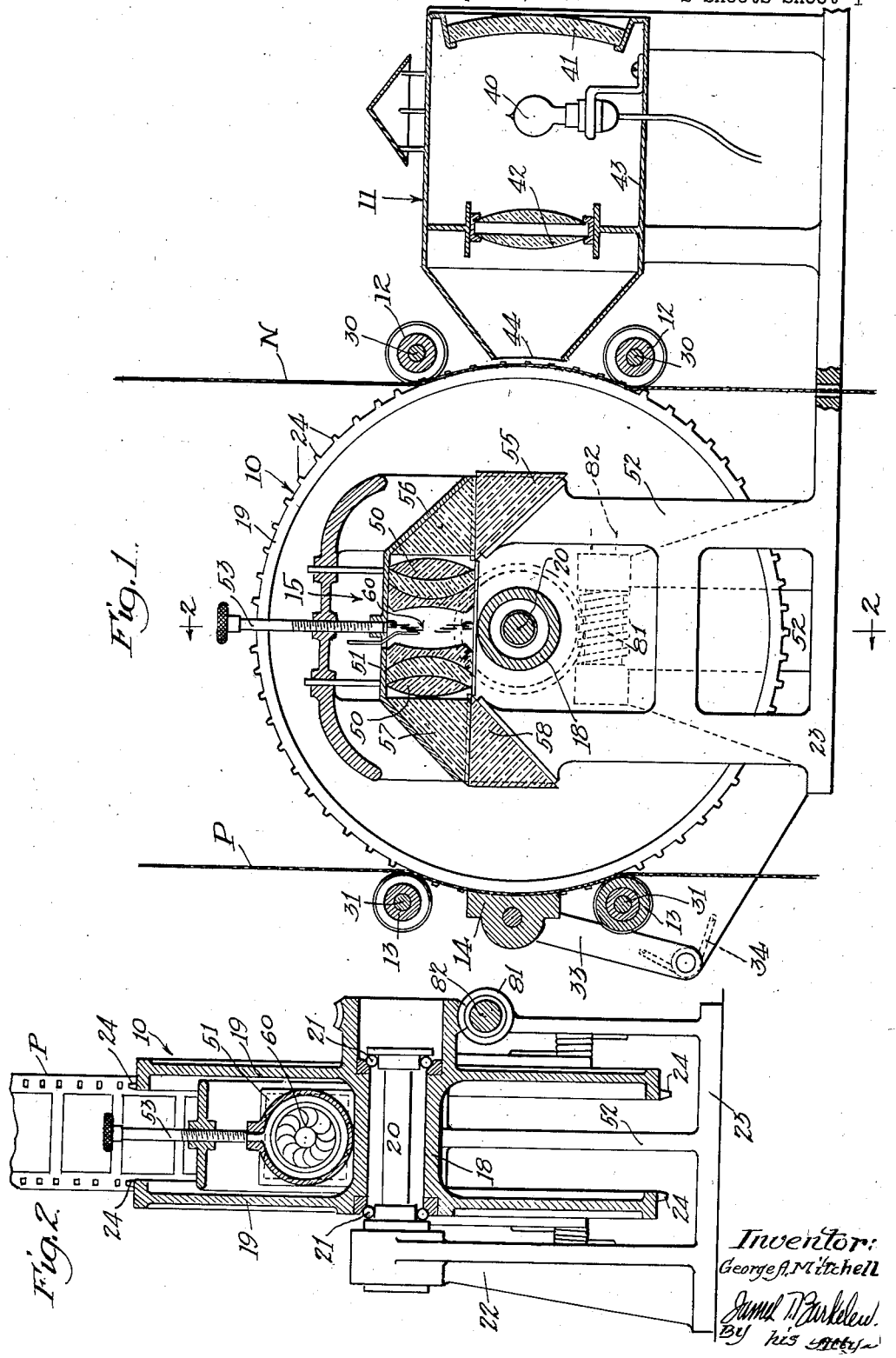

Patented May 11, 1926.

1,584,185

UNITED STATES PATENT OFFICE.

GEORGE A. MITCHELL, OF LOS ANGELES, CALIFORNIA, ASSIGNOR TO MITCHELL CAMERA CORPORATION, A CORPORATION OF CALIFORNIA.

PRINTER.

Application filed September 5, 1922. Serial No. 586,329.

This invention has to do with a printer for printing positive film, or the like, from negative film, or the like, and has special reference to that general class of printer in which the positive is printed from the negative through a lens.

It is an object of this invention to provide a printer of the general character above specified which will hold the object, or negative film, being printed from and the object, or positive film, being printed onto in proper register and so that their movements exactly correspond.

It is another object of this invention to eliminate, in a printer of the character specified, all gearing, relatively working parts, etc., between the support and moving means for the two films, and thereby eliminate numerous difficulties and inconveniences which are common to printers of this character.

The various objects and features of the present invention will be best and more fully understood from the following detailed description of two typical embodiments of the invention throughout which reference is had to the accompanying drawings, in which:

Fig. 1 is a longitudinal central sectional view of a printer embodying the present invention; Fig. 2 is a vertical transverse detail sectional view of the printer shown in Fig. 1, being a view taken as indicated by line 2—2 on Fig. 1; Fig. 3 is a view similar to Fig. 1 of another form of printer embodying the present invention; and Fig. 4 is a view of the printer shown in Fig. 1 taken as indicated by line 4—4 on Fig. 3.

Generally the present invention provides a single member, preferably a rotatable circular member, for supporting both the positive and negative films, means for illuminating the negative film, means for guiding and holding the films in proper supported engagement with said single member, and a lens between the two film supporting parts of said single member to receive light from the illuminated negative film and direct it onto the positive film. For the sake of convenience and simplicity I will hereinafter refer to the present invention being used to handle positive and negative films, but by so doing I do not wish to specifically limit the scope of my invention as it will be obvious that it may be used for handling other objects like or equivalent to films.

Referring now particularly to Figs. 1 and 2 of the drawings numeral 10 designates, generally, a single film supporting member provided by the invention; numeral 11 designates, generally, illuminating means, letter N designates the negative film, letter P designates the positive film, numeral 12 designates rollers which constitute the means for guiding and holding the negative film in proper supported engagement with the member 10, numerals 13 designate rollers which together with a backing plate 14, constitute the means for guiding and holding the positive film in proper supported engagement with the member 10, and numeral 15 designates the lens device.

The member 10 is preferably a circular, or wheel-like, member mounted for rotation about a fixed axis. In the particular form of the invention now under consideration the member 10 comprises a hub 18, and two circular parts 19 concentric with the hub 18 and located on the hub 18 so that they are spaced apart, as clearly illustrated in Fig. 2 of the drawings. The hub 18 is mounted on a shaft 20, preferably by means of suitable ball bearings 21, so that it is freely rotatable. The shaft 20 is firmly carried by a standard 22 which extends from the base 23 of the device. The printer under consideration being designed to handle standard motion picture film, the peripheries of the circular parts 19 are provided at their inner edges with teeth 24 adapted to engage the perforations at the edges of the films. A film to be supported by the member 10 is arranged to extend between the two parts 19 so that its edge portions are supported by the peripheries of the parts 19 and so that the teeth 24, extending from the peripheries of the parts 19, cooperate with the perforations at its edges. It is preferred in practice that the member 10 be an integral or continuous member so that there is no danger of any of its parts shifting or moving relative to each other. Driving means for the member 10 may comprise a worm 81 mounted on a drive shaft 82 to mesh with a worm wheel on one end of the hub 18.

The rollers 12 are idle rollers rotatably carried on shafts 30. The rollers 12 are spaced apart and are related to the member 10 so that they operate to guide and hold a portion of the negative film N in proper supported engagement on the member 10. It will be obvious, of course, that the exact amount of negative film N held in supported engagement on the member 10 at a time will depend upon the arrangement and spacing of the rollers 12. In practice the rollers 12 are arranged and related so that a considerable length of negative film is supported on the member 10 so that the part of the negative film N which is illuminated by the means 11 is accurately and fully supported on the member 10.

The rollers 13 are rotatably carried on shafts 31 and are spaced apart and related to the member 10, so that the guide will hold a portion of the positive film P in supported engagement on the member 10. In the particular printer under consideration the rollers 13 are arranged so that they hold the film P on the member 10 at a point diametrically opposite the film N. The backing plate 14 is designed to accurately fit and back up the positive film P in mounted engagement of the member 10. The plate 14 is carried on an arm 33 which is normally urged toward the film P by a suitable spring 34. It will be obvious that means other than the ones herein set forth may be employed to guide and hold the films in proper mounted engagement on the member 10 so, therefore, I do not wish it understood that the present invention is limited to the specific form of means which I have disclosed.

The illuminating means 11 which I have illustrated in the drawings includes a source of light 40, a reflector 41 back of the source of light, a condenser lens 42 in front of the source of light, and a suitable housing 43 which houses and carries the other parts. The housing 43 is provided with an aperture 44 at the supported portion of the negative film N, so that the light generated at the source of light 40 illuminates only the desired part of the negative film N. From inspection of the drawings it will be obvious how light generated at the source of light 40 shines directly on the condenser lens device 42, and how light from the source of light 40 is reflected to the condenser lens device 42 by the reflector 41, so that a more or less concentrated shaft of light is directed by the lens device through the aperture 44 onto the desired part of the negative film. As far as the present invention is concerned the illuminating means may be of any convenient or desirable type, it being important only that the part of the negative film desired to be illuminated be illuminated uniformly and, of course, preferably, intensely. With the type of illuminating means herein disclosed it is well that the shaft of light thrown by the condenser lens device be somewhat larger than the aperture 44 in order to assure full and uniform illumination of the illuminated part of the negative film N.

In the particular machine now under consideration the lens device 15 is located between the supported part of the negative film N and the supported part of the positive film T, but is not in a line between them. The lens device 15 is offset from a line between the supported parts of the films so as to avoid the hub 18 of the member 10. In a preferred arrangement the lens device 15 is arranged parallel with a line between the supported parts of the film and is offset upwardly, as I have illustrated in the drawings. The lens device 15 may include suitable lenses 50 and an adjustable carrier 51. The carrier 51 is carried by a standard 52 which extends upwardly from the base 23 between the circular parts 19 of the member 10 and around the hub 18 of the member 10. The carrier 51 is adjustably held in the standard 52 by a suitable adjusting screw 53. The lens device 15 being offset from the line between the supported parts of the film, I provide reflectors 55 and 56 to direct the light from the illuminated part of the negative film N to and through the lenses 50 of the lens device, and reflectors 57 and 58 to direct the light from the lenses 50 onto the desired part of the supported portion of the positive film C. The various reflectors are preferably prismatic reflectors, as I have illustrated in the drawings. The reflector 55 is carried by the standard 52 and receives the light directly from the illuminated part of the negative film N and directs it upwardly. The reflector 56 is carried by the carrier 51 and receives light from the reflector 55 and directs through the lenses 50. The reflector 57 is carried by the carrier 51 and receives light from the lenses 50 and directs it downwardly. The reflector 58 is carried by the standard 52 and receives the light from the reflector 57 and directs it onto the desired part of the positive film P. The arrangement just described is particularly desirable as it makes it possible to readily and accurately vary or adjust the distance the light has to travel from the negative film N to the positive film P. For the purpose of regulating the intensity of the light passing from the negative film N to the positive film P I provide an iris mechanism 60 in the path of the light preferably in the lens device 15.

From the foregoing description it is believed that the operation of the device will be clearly and fully understood. The films N and P can be readily arranged in the device so that they have portions supported at different parts of the member 10. The supported parts of the films are definitely and positively spaced apart and being mounted or carried by the same single member they are necessarily moved at the same speed and the same amount upon rotation of the member 10. The teeth 24 of the member 10 cooperates with the perforations in the films so that the films are definitely fed by rotation of the member 10 and cannot possibly slip or shift in position on the member 10. During operation the illuminating means 11 operates to illuminate the desired part of the supported portion of the negative film N and the member 10 is rotated causing both of the films to be fed or advanced at exactly the same rate and to exactly the same degree. It will be obvious, of course, how the light from the illuminated part of the negative film is directed by the reflectors and lens device 15 onto the desired part of the supported portion of the positive film P. In the present case the two films are fed in opposite directions by the member 10 so therefore the lens device 15 is one which will invert the image being printed from the negative film onto the positive film so that the pictures on the positive film are of the desired arrangement.

In Figs. 3 and 4 of the drawings I illustrate a form of the invention in which the member 10ª is of somewhat different formation and construction than the member 10 hereinabove described, it being such as to allow light from the illuminated part of the negative film to pass in a straight line through the lens device 15ª onto the desired part of the positive film P. The member 10ª is a wheel-like member embodying two spaced flat annular parts 19ª, a plurality of small thin bars 70 connecting the parts 19ª at their peripheries, teeth 24ª provided on the peripheries of the parts 19ª, and hollow trunnion parts 18ª extending outwardly from the inner periphery of the parts 19ª. The openings in the trunnion parts 18ª are sufficiently large to pass the lens mechanism 15ª to allow it to be arranged in the proper position between the supported portions of the films. The trunnion parts 18ª are rotatably carried in suitable standards 22ª extending from the base 23. One of the trunnion parts 18ª is provided with a worm wheel 80 which meshes with a worm 81 mounted on the drive shaft 82. The bars 70 connect and tie together the parts 19ª, yet are not sufficiently thick to interfere with the operation of the device. In practice the bars 70 are so spaced and the films are so arranged in connection with the member 10ª that the bars 70 come between adjacent pictures on the film and therefore do not interfere with the printing. The other parts of this form of the invention may be substantially the same as the corresponding parts in the form of the invention first described.

In operation this form of the invention is substantially the same as the one first described except that the light from the illuminated part of the negative film N passes straight from the illuminated part of the negative film through the lens device 15ª to the desired part of the positive film.

Having described only typical embodiments of my invention I do not wish to limit myself to the particular details hereinabove set forth but wish to reserve to myself any changes or variations that may appear to those skilled in the art and that may fall within the scope of the following claims.

Having thus described a preferred form of my invention, I claim:—

1. In a printer of the character described, a single moving member adapted to support films in definite spaced relation, means for illuminating one film, and a lens between the films to pass light from the illuminated film to the other film.

2. In a printer of the character described, a single rotating member adapted to carry films in definite spaced relation, means for illuminating one of the films while it is carried by said member, and a lens between the film carrying parts of said member to pass light from the illuminated film to the other film.

3. In a printer of the character described, a single rotating wheel like member adapted to carry films in definite spaced relation, means for illuminating one film, and a lens within said member for passing light from the illuminated film to the other film.

4. In a printer of the character described, a single rotating wheel like member adapted to carry films in definite spaced relation at substantially diametrically opposite points, means for illuminating one film, and a lens within said member for passing light from the illuminated film to the other film.

5. In a printer of the character described, a single moving member having two spaced parts adapted to support films by their edges and in definite spaced relation, means for illuminating one film, and a lens between the films to pass light from the illuminated film to the other film.

6. In a printer of the character described, a single member operating to support and advance two films in definite relation to each other, means for illuminating one film, and a lens between the films to pass light from the illuminated film to the other film.

7. In a printer of the character described, a single rotating member, means for holding films in supported engagement on said member, means for illuminating one film, and a lens between the films to pass light from the illuminated film to the other film.

8. In a printer of the character described, a single rotating member, means for holding films in supported engagement with said member at points where said member is moving in different directions, means for illuminating one film, and a lens between the films to pass light from the illuminated film to the other film.

9. In a printer of the character described, a single rotating member, means for holding films in supported engagement with said member at points where said member is moving in different directions, means whereby the supported films move with said member, means for illuminating one film, and a lens between the films to pass light from the illuminated film to the other film.

10. In a printer of the character described, a single moving member adapted to support films in definite spaced relation, means for illuminating one of the films, means for directing light from the illuminated film onto the other film, and means for varying the distance travel of the light from the illuminated film to the other film.

11. In a printer of the character described, a single rotating member, means for guiding and holding two film strips in supported engagement with said member, means for illuminating one film, and a lens between the films to pass light from the illuminated film to the other film.

12. In a printer of the character described, a single rotating member, rollers for guiding and holding two film strips in supported engagement with said member, means for illuminating one film, and a lens between the films to pass light from the illuminated film to the other film.

13. In a printer of the character described, a single moving member adapted to support film in definite spaced relation, means for illuminating only a part of one of the films, and a lens between the films to pass light from the illuminated part of said film to the other film.

14. In a printer of the character described, a single moving member adapted to support films in definite spaced relation, means for illuminating one film, and an adjustable lens between the films to pass light from the illuminated film to the other film.

15. In a printer of the character described, a single moving member adapted to support films in definite spaced relation, means for illuminating one film, a lens, and means for reflecting light from the illuminated film so that it passes through the lens and to the other film.

16. In a printer of the character described, a single moving member adapted to support films in definite spaced relation, means for illuminating one film, a lens, means for reflecting light from the illuminated film through the lens, and means for reflecting light from the lens to the other film.

17. In a printer of the character described, a single moving member adapted to support films in definite spaced relation, an illuminant located outside one of the films in illuminating relation thereto, and a lens between the films positioned to project the image of the illuminated film onto the other one.

18. In a printer of the character described, a single rotating member, means for holding films in supported engagement with said member at points where said member is moving in different directions, means whereby the supported films move with said member, an illuminant outside one of the films in illuminating relation thereto, and a lens between the films positioned to project the image of the illuminated films onto the other one.

19. In a printer of the character described, a single film moving member adapted to support and move two films in definite spaced-apart relation, means for illuminating one film, and means located between the spaced film for forming an image of the illuminated film on the other film.

20. A printing apparatus comprising a feed member, acting on a negative film at one side and on a positive film at the other side with a lens between the sides of said feed member and a source of light outside the negative film in substantial alignment with said lens.

21. Apparatus according to claim 20 in which the feed member comprises duplex sprocket wheels adapted to feed the films in opposite directions and at the same speed at its opposite sides with the lens located between said wheels and midway between the films acted on thereby.

22. In a printer of the character described, a single member adapted to support and move two films in definite spaced relation, means for forming an image of one film on the other, and means for adjusting the image forming means to the distance between the two films.

23. In a printer of the character described, means for supporting and moving two films in spaced and substantially parallel relation, an image forming lens between the two films, with its axis perpendicular to the films, a reflector at each end of the lens, set at substantially forty five degrees to the lens axis, two other reflectors set between the films at substantially forty five degrees to the lens axis, and means to move the lens and the two first mentioned reflectors together in a direction substantially parallel to the films.

In witness that I claim the foregoing I have hereunto subscribed my name this 29th day of Aug., 1922.

GEORGE A. MITCHELL.